United States Patent [19]

Vasilieva et al.

[11] 4,428,058
[45] Jan. 24, 1984

[54] METHOD OF DETERMINING TEMPERATURE OF GAS AND PARTICLES IN MAGNETOHYDRODYNAMIC GENERATOR

[75] Inventors: Inna A. Vasilieva; Alexandr S. Urinson, both of Moscow, U.S.S.R.

[73] Assignee: Institut Vysokikh Temperatur Akademii Nauk SSR, Moscow, U.S.S.R.

[21] Appl. No.: 263,408

[22] Filed: May 14, 1981

[30] Foreign Application Priority Data

May 14, 1980 [SU] U.S.S.R. ............................ 2915901

[51] Int. Cl.³ ........................ G01J 5/00; G01K 13/00
[52] U.S. Cl. ............................... 364/557; 374/123; 310/11
[58] Field of Search ............ 73/355 R, 355 EM; 376/256, 103, 247; 364/557; 310/11; 374/123, 130, 121

[56] References Cited

U.S. PATENT DOCUMENTS

| | | | |
|---|---|---|---|
| 3,067,610 | 12/1962 | Bockemuehl et al. | 73/355 R X |
| 3,247,375 | 4/1966 | Lovelock | 73/25.1 |
| 3,724,268 | 4/1973 | Kuwabara | 374/130 X |
| 3,736,447 | 5/1973 | Zanderer | 310/11 |
| 3,777,568 | 12/1973 | Risgin et al. | 73/355 EM |
| 3,829,666 | 8/1974 | Hohenberg et al. | 364/557 X |
| 4,071,745 | 1/1978 | Hall | 364/557 X |

OTHER PUBLICATIONS

15th Symposium on MHD Generators; I. A. Vasilieva, G. P. Maluzhonok, A. P. Nefedov, L. P. Poberezhski, E. M. Shelkov, V. Smith, S. Petty, Philadelphia, USA, Nay, 1976.
"Development of a System for Measuring Temperature in a Two-Phase Jet of Carbon-Dust Combustion Products", by Ya. Litsky (Proceedings of HTI, Academy of Sciences of the USSR, Moscow, 1979, pp. 133-136, in Russian).
2nd American-Societ Colloquium, "American-Soviet Cooperation in the Field of MHD Power", 1975, Washington.
"Plasma Diagnostics," ed. by W. Lochte-Holtgreven, Kiel University, Amsterdam, 1968.
Carlson D. J., "Temperature, Its Measurement and Control in Science and Industry," ed. by C. M. Herzfeld, 1962, VII, Part 2, pp. 535-550.

*Primary Examiner*—Daniel M. Yasich
*Attorney, Agent, or Firm*—Lilling & Greenspan

[57] ABSTRACT

The method of determining temperature of gas and particles in a conductive working medium of a magneto hydrodynamic generator comprises the steps of measuring values $\phi_1$, $\phi_2$ and $\phi_3$ of radiation fluxes from a primary radiation source, the working medium of the MHD generator and a working medium subject to radiation from the primary source at least on two wavelengths $\lambda_1$ and $\lambda_2$; and computing the temperature of gas and particles from relationships obtained by a generalized method of reversing spectral lines. The wavelength $\lambda_1$ is found at the center of a resonant line of an alkaline metal spectrum. Selection is made during measurements of those groups from a sequence of the obtained groups of values $\phi_1$, $\phi_2$ and $\phi_3$ at a permissible error k.

2 Claims, 1 Drawing Figure

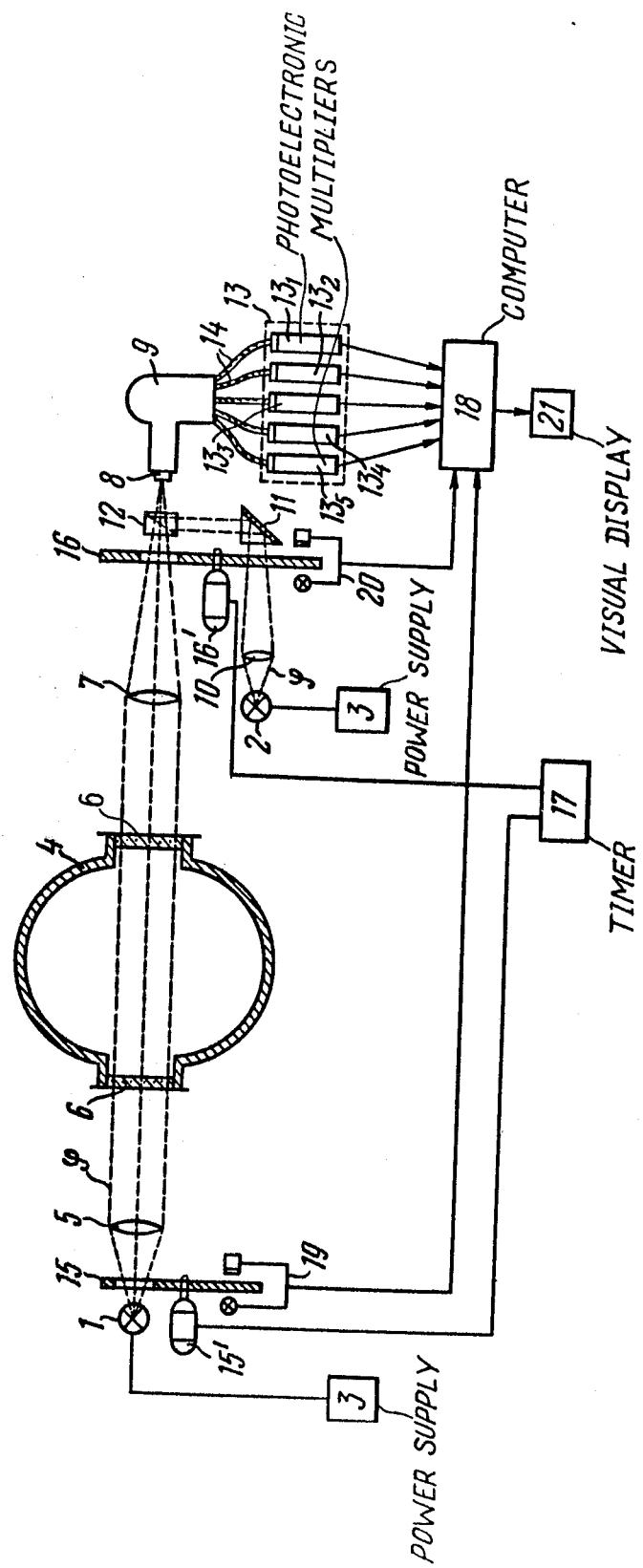

METHOD OF DETERMINING TEMPERATURE OF GAS AND PARTICLES IN MAGNETOHYDRODYNAMIC GENERATOR

FIELD OF THE INVENTION

The invention relates to measurements of temperature of combustion products, more particularly to a method of determining temperature of gas and particles in a conductive working medium of a magnetohydrodynamic (MHD) generator.

DESCRIPTION OF THE PRIOR ART

Temperature of combustion products is normally measured by a generalized method of reversing spectral lines (cf. 15th Symposium on MHD Generators; I. A. Vasilieva, G. P. Maluzhonok, A. P. Nefedov, L. P. Poberezhski, E. M. Shelkov, V. Smith, S. Petty, Philadelphia, USA, May, 1976).

In determining gas temperature by the aforesaid method, measurements are made of the intensity of three luminous fluxes in the region of the spectral line characterizing gas radiation: value $\phi 1$ of radiation intensity of a primary source having a known temperature T; value $\phi 2$ of radiation intensity of combustion products; and value $\phi 3$ of radiation intensity of combustion products subject to radiation from the primary source.

Using the afore-mentioned three values ($\phi 1$, $\phi 2$ and $\phi 3$) and referring to the known relationships it is possible to determine temperature of gaseous combustion products. A disadvantage of the aforesaid method is that it does not permit measuring the temperature of gas and particles if the combustion products contain solid or liquid particles.

Also known in the art is a method of determining temperature of a working medium of a MHD generator described in "Development of a System for Measuring Temperature in a Two-Phase Jet of Carbon-Dust Combustion Products" by Ya.Litsky (proceedings of HTI, Academy of Sciences of the USSR, Moscow, 1979, pp. 133–136, in Russian).

The foregoing method comprises the steps of obtaining three radiation fluxes: a radiation flux from a primary radiation source having intensity $\phi 1$, a radiation flux from a working medium (plasma) of a MHD generator having intensity $\phi 2$ and a radiation flux from a working medium subject to radiation from the primary source having intensity $\phi 3$, and measuring the values $\phi 1$, $\phi 2$ and $\phi 3$ in electrical units (volts) on different wavelengths ($\lambda_1$ and $\lambda_2$), $\lambda_1$ being the wavelength resonant line of an alkaline metal, while $\lambda_2$ is chosen so that radiation on this wavelength is conditioned soley by particles. The obtained intensity values $\phi 1$, $\phi 2$ and $\phi 3$ are utilized for determining temperature of gas and plasma particles.

With the prior art methods, however, measurements of temperature of gas and particles are characterized by the occurrence of a random instrumental error which cannot be controlled in the course of experiments. When measurements are made in a stationary medium, such an error may be reduced by increasing the number of measurements. This cannot be done, however, in dealing with a nonstationary working medium of a MHD generator since the characteristic time of measuring radiation intensity of the working medium of the MHD generator is comparable with a time period between generation of two successive groups of electrical signals corresponding to intensity values $\phi 1$, $\phi 2$ and $\phi 3$, which are used to compute the temperature.

Furthermore, no criterion exists for determining the relationship between wavelengths $\lambda_1$ and $\lambda_2$. Such a criterion is generally indispensable since, in the MHD generator, alkaline-metal resonant spectral lines have wide wings. So, with a randomly chosen wavelength $\lambda_2$, there exists a probability that the wavelength $\lambda_2$ may be found within the wing of the spectral line, a factor increasing a temperature measurement error.

Low accuracy in measuring temperature of gas and particles in the working medium of the MHD generator prevents optimization of operation of the MHD generator and the combustion chamber of the MHD power station, a limitation decreasing power output and causing excessive fuel consumption.

SUMMARY OF THE INVENTION

It is an object of the invention to provide a method for measuring, with a predetermined accuracy, temperature of stationary and nonstationary conductive working medium of a MHD generator with any alkaline additive in the presence of liquid and solid particles, and to increase simultaneously reliability of measurement.

The foregoing object is accomplished by a method of determining temperature of gas and particles in a working medium of a MHD generator comprising the steps of measuring intensity $\phi 1$ of radiation flux from a primary source, intensity $\phi 2$ of a radiation flux from the working medium and intensity $\phi 3$ of radiation flux of a working medium subject to radiation from the primary source at least on two wavelengths $\lambda_1$ and $\lambda_2$, one of the wavelengths $\lambda_1$ being found at the center of a resonant line of an alkaline metal spectrum; and computing temperature of gas and particles from relationships obtained by a generalized method of reversing spectral lines. According to the invention, the wavelength $\lambda_2$ is chosen from the relationship $$\frac{\lambda_1 - \lambda_2}{\Delta \lambda_v} > \left( \frac{5,5 \cdot 10^{19}}{\tau(\lambda_2)} \cdot \frac{P}{T_{min}} \cdot y \cdot l \cdot x_v \right)^{\frac{1}{x}},$$

Selection is made, during measurements on the wavelengths $\lambda_1$ and $\lambda_2$, of those groups from a sequence of the obtained groups of values $\phi 1$, $\phi 2$ and $\phi 3$ at a permissible error K, which satisfy the relationship $$\frac{\left( \frac{\phi 1 - \phi 3}{\phi 2} \right)^2 \phi 2 + \phi 1 + \phi 3}{(\phi 1 + \phi 2 - \phi 3)^2} < \left( \frac{C_2}{\lambda \cdot T_{max}} \right)^2 \cdot \frac{10^{-4} \cdot k^2}{k_1},$$

where

P = pressure of combustion products (atm); $T_{min}$ and $T_{max}$ = approximate values of possible minimum and maximum temperatures of the working medium of the MHD generator (°K.); y = mole content of alkaline metal atoms with a resonant spectral line on the wavelength $\lambda_1$ (%);

l = thickness of the working medium (cm);

$\chi_1$ = Voigt atomic absorption coefficient at a distance $\Delta \lambda v$ from the centre of the spectral line where the Voigt coefficient is transformed into a power factor with an exponent ($-X$);

$C_2$ = radiation constant equalling 14,380 microdegrees;

$k_1$ = coefficient determining a shot effect in a photodetector, dimensions of the coefficient $k_1$ being equal to the dimensions of quantities $\phi 1$, $\phi 2$ and $\phi 3$; $\lambda = \lambda_1$ or $\lambda_2$ ($\mu$m)

$\tau(\lambda_2)$ = permissible optical density on the wavelength $\lambda_2$, $$\tau(\lambda_2) \leq \ln \frac{\phi 1(\lambda_2)}{\phi 3(\lambda_2) - \phi 1(\lambda_2)} \cdot \frac{e^{\frac{C_2 \cdot k}{\lambda_2 \cdot T'}} - 1}{\frac{\phi 2(\lambda_1)}{\phi 2(\lambda_2)} - 1},$$

where $T'$ = measured temperature of particles, (°K.).

Advantageously in the method forming the subject of the present invention intensity values $\phi 1$, $\phi 2$ and $\phi 3$ of radiation fluxes should be preliminarily measured on n wavelengths and the wavelength $\lambda_2$ satisfying the relationship given below should be chosen from n values of the wavelengths $$\frac{\lambda_1 - \lambda_2}{\Delta \lambda_\nu} > \left( \frac{5.5 \cdot 10^{19}}{\tau(\lambda_2)} \cdot \frac{P}{T_{min}} \cdot y \cdot l \cdot x_\nu \right)^{\frac{1}{x}},$$

the subsequent step being measurement of intensity values $\phi 1$, $\phi 2$ and $\phi 3$ of radiation fluxes on the wavelengths $\lambda_1$ and $\lambda_2$.

Thus, the temperature of the working medium of the MHD generator may be measured to a desired accuracy due to the possibility of introducing and utilizing in the hereinproposed method of determining temperature of gas and particles in a working medium of a MHD generator two quantitative criteria determining quality and fitness of each measurement of intensity values $\phi 1$, $\phi 2$ and $\phi 3$ of fluxes on the chosen wavelength and the distance between the wavelengths $\lambda_1$ and $\lambda_2$. Advantages associated with a higher temperature measuring accuracy are more efficient conversion of thermal energy into electrical energy, saving of fuel, and the possibility of utilizing the given parameter in automatic control systems.

The criterion determining the quality of intensity measurements may be established from the analysis of random instrumental errors of devices for measuring plasma temperature. The detecting element of the devices measuring intensity values $\phi 1$, $\phi 2$ and $\phi 3$ normally represents a photodetector, the value of random instrumental errors being primarily determined by the shot effect of the photodetector. Considering the aforesaid, the expression yielding a relative random instrumental temperature measurement error $(\Delta T/T)^2$ and deduced analytically from the known relationship may be written as $$\left( \frac{\Delta T}{T} \right)^2 = \left( \frac{\lambda \cdot T}{C_2} \right)^2 \cdot \frac{\left( \frac{\phi 1 - \phi 3}{\phi 2} \right)^2 \phi 2 + \phi 1 + \phi 3}{(\phi 1 + \phi 2 - \phi 3)^2} \cdot k_1 \quad (1)$$

where $C_2$ = radiation constant equalling 14,380 microdegrees; and $k_1$ = coefficient determining the shot effect.

This coefficient may be determined experimentally or calculated from the known relationships. If the measuring accuracy is determined by a permissible value of k%, then referring to formula (1) we may find a condition for fitness of parameters for a temperature measurement to a desired accuracy, which is superimposed on the intensity values $\phi_1$, $\phi_2$ and $\phi_3$ $$\frac{\left( \frac{\phi 1 - \phi 3}{\phi 2} \right)^2 \phi 2 + \phi 1 + \phi 3}{(\phi 1 + \phi 2 - \phi 3)^2} < \frac{10^{-4} \cdot k^2}{k_1} \left( \frac{C_2}{\lambda \cdot T_{max}} \right)^2, \quad (2)$$

where $T_{max}$ (°K) = approximate value of possible maximum temperature in the MHD generator during measurement.

A criterion determining a minimum distance between the wavelengths $\lambda_1$ and $\lambda_2$ may be obtained provided that optical density on the wing of a spectral line is fairly low. The optical density is a product of atomic concentration, thickness of a radiation layer and atomic absorption coefficient $\chi_1(\Delta\lambda)$. Dependence of the latter quantity on a wavelength has been studied experimentally (cf. 2nd American-Soviet Colloquium "American-Soviet Cooperation in the Field of MHD Power," 1975, Washington) and may be represented at $\Delta\lambda > \Delta\lambda_\nu$.

$$\chi_1(\Delta\lambda) = \chi_\nu \left( \frac{\Delta\lambda}{\Delta\lambda_\nu} \right)^{-x},$$

where $\Delta\lambda$ = distance of the wavelength from the centre of the spectral line;

$\chi_\nu$ = Voigt atomic absorption coefficient at the distance $\Delta\lambda_\nu$, where the Voigt coefficient is transformed into a power factor with an exponent ($-X$).

Expressing atomic concentration in terms of gas mixture pressure P and mole percentage of alkaline atoms y% and setting a maximum permissible value of optical density on the wing $\tau(\lambda_2)$ we get the required relationship for selecting a distance between $\lambda_1$ and $\lambda_2$:

$$\frac{\lambda_1 - \lambda_2}{\Delta\lambda_\nu} > \left( \frac{5.5 \cdot 10^{19}}{\tau(\lambda_2)} \cdot \frac{P}{T_{min}} \cdot y \cdot l \cdot x_\nu \right)^{\frac{1}{x}}, \quad (3)$$

where $T_{min}$ = approximate value of possible minimum temperature in the MHD generator.

Thus, in determining to a desired preset accuracy temperature of the working medium of the MHD generator with any alkaline additive in the presence of particles, the wavelength $\lambda_1$ on which the measurement is performed should be chosen at the center of an alkaline metal resonant line and the other wavelength $\lambda_2$ should be separated from $\lambda_1$ by a value determined by inequality (3), while fitness of each group of measured intensity values $\phi 1$, $\phi 2$ and $\phi 3$ for a temperature measurement will be checked using the relationship (2). If the inequality (2) is not fulfilled, the corresponding group of measurements may not be used for determining temperature.

BRIEF DESCRIPTION OF THE DRAWING

The invention will now be described with reference to a specific embodiment thereof, taken in conjunction with the accompanying drawing which is a functional block diagram of a device for determining temperature of gas in a MHD generator using coal combustion products, which executes the hereinproposed method.

DETAILED DESCRIPTION OF THE INVENTION

Referring to the accompanying drawing the device comprises a primary radiation source 1 for examining plasma acting as a conductive working medium of a MHD generator, and an auxiliary radiation source 2. The radiation sources 1 and 2 are fed from regulated power supplies 3.

Installed between the primary source 1 and a working chamber 4 containing plasma or a working medium are a lens 5 and protective glass 6 of the device. Temperature measurements in the MHD generator involve the use of a quasi-parallel light beam. This is done by placing the filament of the primary source 1 in the focal plane of the lens 5. A lens 7 placed after the working chamber 4 is designed to focus plasma radiation into an entrance slot 8 of a spectrograph 9 utilized for obtaining monochromatic plasma radiation. A lens 10, a prism 11 and a turning prism 12 with a transulucent diagonal are installed between the auxiliary source 2 and the entrance slot 8 of the spectrograph 9 along the path of radiation flux from said source 2 (paths of fluxes $\phi$ are shown with dashed lines).

Arranged at the output of the spectrograph 9 is a unit 13 comprising photoelectrical multipliers $13_1$, $13_2$–$13_n$ (where n=5 in the given case) connected with the spectrograph 9 through light guides 14. The input ends of the light guides 14 are disposed in the output plane of the spectrograph 9 so as to receive radiation on n wavelengths separated by $\Delta\lambda_1 = 15$ Å relative to one another, beginning from the resonant spectral line on which the measurement is performed. The number of the photoelectronic multipliers $13_1$–$13_n$ and the light guides 14 is chosen in each particular instance depending on the measurement device.

With such an arrangement, modulators 15 and 16 provide time separation of light fluxes from the sources 1 and 2 and the working medium.

Cophasal rotation of motors $15^1$ and $16^1$ of the modulators 15 and 16 is ensured by a timer 17 which makes it possible to automatically set and maintain a given phase shift between the light fluxes from the sources 1 and 2 separated by the modulators 15 and 16.

The radiation fluxes $\phi 1$, $\phi 2$ and $\phi 3$ come successively to the input of the photoelectronic multipliers $13_1$–$13_5$. Electrical signals from the outputs of said multipliers arrive at data inputs of a computer 18 calculating the temperature. Connected to the other input of the computer 18 are photon-coupled pairs 19, 20 arranged on the modulators 15, 16 and designed to decode signals coming to data inputs of the computer 18.

The computer 18 determines temperature of gas and particles and supplies the received data to a visual display 21 connected thereto.

The device operates to execute the hereinproposed method. The modulators 15 and 16 and the timer 17 are turned on before measurement. The timer enables alternate delivery of the radiation fluxes $\phi$ from the sources 1 and 2 to the entrance slot 8 of the spectrograph 9.

The subsequent steps are to set current of the primary source 1 having flux intensity $\phi 1$ and to adjust the spectrograph 9 so that the input of the photoelectric multiplier $13_1$ accepts radiation only from the resonant line of the alkaline metal spectrum wherein the temperature measurement is made. The wavelength is $\lambda_1$. The indication of the photoelectrical multiplier $13_1$ is used to set intensity of radiation from the source 2, which should also equal $\phi 1$ or $\phi 2$ considering the fact that, in this case, the radiation component of the working medium (plasma) should be absent (delivery of the additive to the working chamber is stopped and the combustion chamber is inoperative). In this case, $\phi 3 = \phi 1$, i.e. the radiation fluxes from the sources 1 and 2 are equivalent. The next step is to check the equality of the radiation fluxes $\phi 3 = \phi 1$ by reference to the photoelectronic multipliers $13_2$–$13_5$, which are tuned to wavelengths separated by $\Delta\lambda_i = 15$ Å.

Now the device is prepared for operation. It picks up measuring conditions when the working medium appears in the working chamber 4 and the radiation intensity reaches the corresponding value $\phi 2$ exceeding a threshold level.

The photoelectronic multipliers $13_1$–$13_5$ successively measure intensity levels $\phi 1$, $\phi 2$ and $\phi 3$ of three radiation fluxes $\phi$ on five wavelengths separated by $\Delta\lambda\phi = 15$ Å: intensity $\phi 1$ of the radiation flux delivered from the auxiliary source 2 through the lens 10, modulator 16, prisms 11 and 12 to the entrance slot of the spectrograph 9; intensity $\phi 2$ of the radiation flux delivered from the working medium in the working chamber 4 of the MHD generator through the lens 7, modulator 16 and the prism 12 to the entrance slot 8 of the spectrograph 9 in the absence of radiation flux from the primary source 1; intensity $\phi 3$ of the radiation flux delivered from the primary source 1 through the modulator 15, lens 5 and the glass 6 to the working chamber 4 and affecting the working medium, From the output of the working chamber 4 the radiation flux including the radiation component of the working medium is transmitted through the lens 7, modulator 16 and the prism 12 to the entrance slot 8 of the spectrograph 9.

The time periods over which intensity values $\phi 1$, $\phi 2$ and $\phi 3$ of each radiation flux are measured depend on the rotation speed of the modulators 15 and 16 and also on the size the light holes thereof.

The photoelectronic multipliers $13_1$–$13_5$ develop at their outputs electrical signals which are equivalent of intensity values $\phi 1$, $\phi 2$ and $\phi 3$ of the radiation fluxes. These electrical signals are fed to the inputs of the computer 18 which, upon receipt of signals from the photon-coupled pairs 19 and 20, decodes and represents them in absolute values of radiation fluxes whose intensity levels are $\phi 1$, $\phi 2$ and $\phi 3$.

In measuring a series of values $\phi 1$, $\phi 2$ and $\phi 3$ of the radiation fluxes passing through the photoelectronic multipliers $13_1$–$13_5$ receiving radiation on wavelengths $\lambda_1$–$\lambda_5$, respectively, the values $\phi 1$, $\phi 2$ and $\phi 3$ will be analyzed by the computer 18. One such series includes 15 measurements:

$$\phi 1\lambda_1 \div \phi 1\lambda_5, \phi 2\lambda_1 \div \phi 2\lambda_5, \phi 3\lambda_1 \div \phi 3\lambda_5$$

Temperature of gas and particles may be determined after the computer stores a desired accuracy k of determining temperature of gas and particles, formulas and constants enabling calculation of temperature of gas and particles and criteria (2) determining fitness of each series of light fluxes ($\phi 1\lambda_1$, $\phi 2\lambda_1$, $\phi 3\lambda_2$, $\phi 2\lambda_2$, $\phi 3\lambda_2$, etc.). Excluded from temperature calculation in determining temperature of nonstationary working medium are measurements which do not conform to criteria (2).

EXAMPLE

Basic data: P=1 atm; expected minimum and maximum temperatures $T_{min}=2300°$ K., $T_{max}=3000°$ K.; potassium mole content $y_{Ka}=1\%$; thickness of working layer $l=20$ cm.

The device employs the photomultipliers $13_1$–$13_5$. For simplicity, we use the mean factor of the shot effect measured experimentally for a given series of the photomultipliers $13_1$–$13_5$, $k_1 = 2 \cdot 10^{-3}$ V.

The measurement is made in the region of the resonant spectral line of Na on the wavelength $\lambda_1 = 5890$ Å $\sim 0.59$ μm.

Special experiments with commercial potassium carbonate show that the content of sodium atoms amounts to more than 0.05 of the content of potassium atoms. Thus, $y_{Na}=0.05\%$. We find that $\Delta\lambda_\nu=10$ Å and $x=1.2$ (cf. 2nd American-Soviet Colloquium, "American-Soviet Cooperation in the Field of MHD Power," 1975, Washington). Referring to the formulas determining the Voigt coefficient (cf. "Plasma Diagnostics", ed. by W. Lochte-Holtgreven, Kiel University, Amsterdam, 1968) we find that $\chi_1=2\cdot10^{-17}$ cm². Assume that a permissible error in determining gas temperature is $k_{gas}=1.5\%$ and a specified error in determining temperature of particles is $k_{part.}=3\%$. The computer 18 is used to analyze the series of measurements of values $\phi 1$, $\phi 2$ and $\phi 3$ on wavelengths $(\lambda_2, \lambda_3, \lambda_4, \lambda_5)=\lambda_n$ to find the wavelength on which the permissible optical density is determined from the relationship $$\tau(\lambda_n) \leq \ln \frac{\phi 1(\lambda_n)}{\phi 3(\lambda_n) - \phi 1(\lambda_n)} \cdot \frac{e^{\frac{C_2 \cdot k}{\lambda_2 \cdot T}} - 1}{\frac{\phi 2(\lambda_1)}{\phi 2(\lambda_n)} - 1} \quad (4)$$

Table 1 contains data obtained during measurements of $\phi 1$, $\phi 2$ and $\phi 3$ on the wavelength $\lambda_1$. Table 2 gives data obtained in measuring $\phi 1$, $\phi 2$ and $\phi 3$ on the wavelength $\lambda_3$ to satisfy inequalities (2, 3).

The first three columns of Tables 1 and 2 contain intensity values $\phi 1$, $\phi 2$ and $\phi 3$ of radiation fluxes, while the fourth column gives a combination in the left part of inequality (2). Determine now the permissible value in the right part of inequality (2) for $\phi 1$, $\phi 2$ and $\phi 3$ on the wavelength $\lambda_1$ (error $k=1.5\%$, i.e. fitness criterion). We shall then obtain 7.5 l/V. In measurements of $\phi 1$, $\phi 2$ and $\phi 3$ on the wavelength $\lambda_3$ the fitness criterion is equal to 30 l/V (error $k=3\%$).

Comparing the values given in the fourth column with the above values permits estimating numerically fitness of the obtained values $\phi 1$, $\phi 2$ and $\phi 3$ for temperature measurements (fifth column). Temperature values are given in the sixth and seventh columns.

TABLE 1
(Measurements on $\lambda_1 = 5890$Å)

| $\phi 1(v)$ | $\phi 2(v)$ | $\phi 3(v)$ | $\dfrac{\left(\dfrac{\phi 1 - \phi 3}{\phi 2}\right)^2 \phi 2 + \phi 1 + \phi 3}{(\phi 1 + \phi 2 - \phi 3)^2} \cdot \dfrac{1}{v}$ | Fitness 7.5 l/v | $T_{opt}$ (°K.) | $T_{gas}$ (°K.) |
|---|---|---|---|---|---|---|
| 4.6 | 6.5 | 8.0 | 1.5 | + | 2560 | 2600 |
| 4.0 | 15.3 | 16.0 | 2.7 | + | 2790 | 2820 |
| 4.6 | 6.5 | 10 | 15.7 | − | — | — |
| 4.0 | — | 9.5 | 7.9 | − | — | — |
| 4.0 | 6 | 8 | 3.7 | + | 2660 | 2740 |

TABLE 2
(Measurements on $\lambda_3 = 5860$Å)

| $\phi 1(v)$ | $\phi 2(v)$ | $\phi 3(v)$ | $\dfrac{\left(\dfrac{\phi 1 - \phi 3}{\phi 2}\right)^2 \phi 2 + \phi 1 + \phi 3}{(\phi 1 + \phi 2 - \phi 3)^2} \cdot \dfrac{1}{v}$ | Fitness 30 l/v | $T'_{part}$ (°K.) |
|---|---|---|---|---|---|
| 3.2 | 0.9 | 3.5 | 19 | + | 2470 |
| 3.2 | 0.8 | 3.4 | 18 | + | 2440 |
| 3.2 | 1.0 | 3.5 | 19 | + | 2450 |
| 3.2 | 0.6 | 3.2 | 18 | + | 2370 |
| 3.2 | 1.0 | 3.2 | 6.4 | + | 2370 |

It is apparent that two groups of intensity values $\phi 1$, $\phi 2$ and $\phi 3$ measured on the wavelength $\lambda_1$ (Nos. 3, 4) are unfit for determining gas temperature to a desired accuracy $k=1.5\%$.

The program of the computer 18 includes estimation of measurement fitness computed from relationship (2). Thus, temperature calculations have been made in all instances except for Nos. 3, 4 in Table 1. The sixth column gives values of temperature T computed by the known formula used in the generalized reversal method $$T_{opt} = T\left[1 - \frac{\lambda T}{C_2} \ln\left(\frac{\phi 2}{\phi 1 + \phi 2 - \phi 3}\right)\right]^{-1}, \quad (5)$$

where $T=2373°$ K. is the filament temperature of the lamp of the primary source 1.

Thereafter the computer 18 introduces corrections for a difference between temperature $T_{opt}$ measured on the wavelength $\lambda_1$ and gas temperature $T_{gas}$ due to the fact that the measurement on the wavelength $\lambda_1$ is affected by the particles. The known correction relationships may be taken from Carlson D. J. "Temperature, Its Measurement and Control in Science and Industry," ed. by C. M. Herzfeld, 1962, VII, Part 2. pp 535–550

$$T_{part} = T_{opt}\left[1 - \frac{\lambda_1 \cdot T_{opt}}{C_2} \ln(1 + \alpha)\right], \quad (6)$$

-continued
$$\alpha = \beta(1 - \gamma), \tag{7}$$

$$\beta = \frac{\ln \frac{\phi_1(\lambda_2)}{\phi_3(\lambda_2) - \phi_2(\lambda_2)}}{\ln \left[\frac{\phi_3(\lambda_2) - \phi_2(\lambda_2)}{\phi_3(\lambda_1) - \phi_2(\lambda_1)} \cdot \frac{\phi_1(\lambda_1)}{\phi_1(\lambda_2)}\right]}, \tag{8}$$

$$\gamma = \frac{\phi_2(\lambda_2)}{\phi_2(\lambda_1)} \cdot \frac{\phi_2(\lambda_1) + \phi_1(\lambda_1) - \phi_3(\lambda_1)}{\phi_2(\lambda_2) + \phi_2(\lambda_1) - \phi_3(\lambda_1)} \cdot \frac{\phi_1(\lambda_2)}{\phi_1(\lambda_1)} \tag{9}$$

Inasmuch as the correction is not normally great mean values $\phi_1(\lambda_3)=3.2$ V, $\phi_2(\lambda_3)=0.86$ V and $\phi_3(\lambda_3)=3.6$ V have been used in calculations. The seventh column of Table 1 gives final results of gas temperature measurements.

The utilization of the method for measuring temperature with a predetermined accuracy permits optimizing operation of a combustion chamber, saves fuel and increases efficiency in converting thermal energy into electrical energy.

With the hereinproposed method for determining temperature of gas and particles the measuring error is 1%. A smaller error in temperature measurements permits decreasing error in determining optimum electric conductivity and, in effect, increases efficiency of energy conversion.

What is claimed is:

1. A method of determining temperature of gas and solid or liquid particles in a conductive working medium contained in a chamber of a magnetohydrodynamic generator comprising the steps of:

measuring intensity value $\phi_1$ of a primary source of radiation passing through walls of said container and having at least two wavelengths having values $\lambda_1$ and $\lambda_2$, respectively;

measuring intensity value $\phi_2$ of radiation of said working medium at least of said two wavelengths having values $\lambda_1$ and $\lambda_2$, respectively;

measuring intensity value $\phi_3$ of radiation of said working medium subject to radiation from said primary source of radiation at least of said two wavelengths $\lambda_1$ and $\lambda_2$;

selecting said wavelength $\lambda_1$ at the center of a resonant line of an alkaline metal spectrum;

selecting said wavelength $\lambda_2$ from the relationship $$\frac{\lambda_1 - \lambda_2}{\Delta\lambda_\nu} > \left(\frac{5.5 \cdot 10^{19}}{\tau(\lambda_2)} \cdot \frac{P}{T_{min}} \cdot y \cdot p \cdot x_\nu\right)^{\frac{1}{x}}$$

repeated measurements of said intensity values $\phi_1$, $\phi_2$, and $\phi_3$ of said radiation fluxes on said wavelengths $\lambda_1$ and $\lambda_2$ to obtain a group of said values;

selecting those groups from said groups of the intensity values $\phi_1$, $\phi_2$ and $\phi_3$ of radiation fluxes, wherein said values $\phi_1$, $\phi_2$ and $\phi_3$ at a permissible error k satisfy the relationship $$\frac{\left(\frac{\phi_1 - \phi_3}{\phi_2}\right)^2 \phi_2 + \phi_1 + \phi_3}{(\phi_1 + \phi_2 - \phi_3)} < \left(\frac{C_2}{\lambda \cdot T_{max}}\right)^2 \cdot \frac{10^{-4} \cdot K^2}{K_1}$$

calculating mathematically the temperature of gas and particles of said working medium of said MHD generator from relationships obtained by a generalized method of reversing spectral lines, where P is the pressure of combustion products;

$T_{min}$, $T_{max}$ = approximate values of possible minimum and maximum temperatures of said working medium of the MHD generator, respectively;

y = mole content of atoms of said alkaline metal with a resonant spectral line one of the alkaline metals on said wave length $\lambda_1$ l = thickness of said working medium;

$\chi_\nu$ = Voigt atomic absorption coefficient at a distance $\Delta\lambda_\nu$ from the centre of the spectral line, where the Voigt coefficient is transformed into a power factor with an exponent $(-X)$;

$C_2$ = radiation constant equalling 14,380 microdegrees;

$k_1$ = coefficient determining the shot effect in a photodector;

$\lambda$ is chosen from $\lambda_1$ and $\lambda_2$;

$\tau(\lambda_2)$ = permissible optical density on said wavelength $\lambda_2$ satisfying the relationship $$\tau(\lambda_2) \leq \ln \frac{\phi_1(\lambda_2)}{\phi_3(\lambda_2) - \phi_1(\lambda_2)} \cdot \frac{e^{\frac{C_2 \cdot K}{\lambda_2 \cdot T'}} - 1}{\frac{\phi_2(\lambda_1)}{\phi_2(\lambda_2)} - 1}$$

where $T'$ = measured temperature of the particles.

2. A method as claimed in claim 1, comprising the steps of:

preliminary measuring said intensity values $\phi_1$, $\phi_2$ and $\phi_3$ of the radiation fluxes on n wavelengths, of which one wavelength is chosen to be equal to said wavelength $\lambda_1$;

selecting said wavelength $\lambda_2$ satisfying said relationship from said n values of wavelengths $$\frac{x_\nu - \lambda_2}{\Delta T_\nu} > \left(\frac{5.5 \cdot 10^{19}}{\tau(\lambda_2)} \cdot \frac{P}{T_{min}} \cdot y \cdot l \cdot \chi_1\right)^{\frac{1}{x}}$$

said measurement of said intensity values $\phi_1$, $\phi_2$ and $\phi_3$ of radiation fluxes on said wavelengths having said values $\lambda_1$ and $\lambda_2$.

* * * * *